United States Patent
Ebsen et al.

(10) Patent No.: US 9,569,280 B2
(45) Date of Patent: Feb. 14, 2017

(54) MANAGING RESOURCE COLLISIONS IN A STORAGE COMPUTE DEVICE

(71) Applicant: Seagate Technology LLC, Cupertino, CA (US)

(72) Inventors: David Scott Ebsen, Minnetonka, MN (US); Ryan James Goss, Prior Lake, MN (US); Jeffrey L. Whaley, Minneapolis, MN (US); Dana Simonson, Owatonna, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 33 days.

(21) Appl. No.: 14/486,234

(22) Filed: Sep. 15, 2014

(65) Prior Publication Data
US 2016/0077885 A1    Mar. 17, 2016

(51) Int. Cl.
*G06F 9/46* (2006.01)
*G06F 9/52* (2006.01)
*G06F 9/50* (2006.01)

(52) U.S. Cl.
CPC ............ *G06F 9/52* (2013.01); *G06F 9/505* (2013.01)

(58) Field of Classification Search
CPC .................................. G06F 9/52; G06F 9/505
USPC .................................................. 718/104, 105
See application file for complete search history.

(56) References Cited

U.S. PATENT DOCUMENTS

| | | | |
|---|---|---|---|
| 5,025,407 A | 6/1991 | Gulley et al. | |
| 5,073,855 A * | 12/1991 | Staplin | G06F 9/3838 712/217 |
| 5,206,822 A | 4/1993 | Taylor | |
| 5,325,525 A * | 6/1994 | Shan | G06F 9/52 712/28 |
| 6,370,565 B1 * | 4/2002 | Van Gong | A63F 13/12 709/205 |
| 6,614,542 B1 * | 9/2003 | Salgado | G06F 3/1204 358/1.12 |
| 6,651,081 B1 * | 11/2003 | Salgado | G06F 9/5044 358/1.14 |
| 6,678,882 B1 * | 1/2004 | Hurley | G06F 8/315 717/121 |
| 6,717,690 B1 * | 4/2004 | Salgado | H04N 1/00915 358/1.14 |
| 6,901,422 B1 | 5/2005 | Sazegari | |
| 7,487,195 B2 | 2/2009 | Gustavson et al. | |
| 7,669,086 B2 * | 2/2010 | Gower | G06F 9/52 711/150 |
| 8,612,404 B2 | 12/2013 | Bone et al. | |
| 8,954,393 B1 * | 2/2015 | Botes | G06F 17/30221 707/635 |

(Continued)

OTHER PUBLICATIONS

Owens et al., "GPU Computing", 2008.*

*Primary Examiner* — Phillip H Nguyen
(74) *Attorney, Agent, or Firm* — Hollingsworth Davis, LLC

(57) ABSTRACT

A storage compute device includes a data storage section that facilitates persistently storing host data as data objects. The storage compute device also includes two or more compute sections that perform computations on the data objects. A controller monitors resource collisions affecting a first of the compute sections. The controller creates a copy of at least one of the data objects to be processed in parallel at a second of the compute sections in response to the resource collisions.

21 Claims, 8 Drawing Sheets

(56) References Cited

U.S. PATENT DOCUMENTS

| | | | |
|---|---|---|---|
| 8,954,979 B1* | 2/2015 | Myers | G06F 9/5083 |
| | | | 718/104 |
| 2002/0157043 A1* | 10/2002 | Hite | G06Q 10/06 |
| | | | 714/51 |
| 2004/0128385 A1* | 7/2004 | Arwe | G06F 9/52 |
| | | | 709/226 |
| 2004/0267747 A1* | 12/2004 | Choi | G06F 17/30171 |
| 2005/0060409 A1* | 3/2005 | Dube | H04L 29/06 |
| | | | 709/226 |
| 2008/0285981 A1* | 11/2008 | Diab | H04L 12/2805 |
| | | | 398/154 |
| 2011/0222408 A1* | 9/2011 | Kasslin | H04L 41/083 |
| | | | 370/241 |
| 2013/0185258 A1 | 7/2013 | Bestler et al. | |
| 2013/0339975 A1* | 12/2013 | Busaba | G06F 9/44 |
| | | | 718/104 |
| 2014/0089282 A1* | 3/2014 | Sampathkumar | G06F 17/30386 |
| | | | 707/705 |

* cited by examiner

MANAGING RESOURCE COLLISIONS IN A STORAGE COMPUTE DEVICE

SUMMARY

The present disclosure is related to managing of resource collisions in a storage compute device. In one embodiment, a system or storage compute device includes a data storage section that facilitates persistently storing host data as data objects. The storage compute device also includes two or more compute sections that perform computations on the data objects. A controller monitors resource collisions affecting a first of the compute sections. The controller creates a copy of at least one of the data objects to be processed in parallel at a second of the compute sections in response to the resource collisions.

In another embodiment, a method involves persistently storing data objects at a storage compute device on behalf of a host. The data objects are internally managed by the storage compute device. Computations are performed on the data objects at a compute section of the storage compute device, and resource collisions affecting at least one of the computations are monitored. A copy is created of at least one of the data objects to be processed in parallel via a second compute section in response to the resource collisions.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures. The drawings are not necessarily to scale.

DETAILED DESCRIPTION

Figure 1:
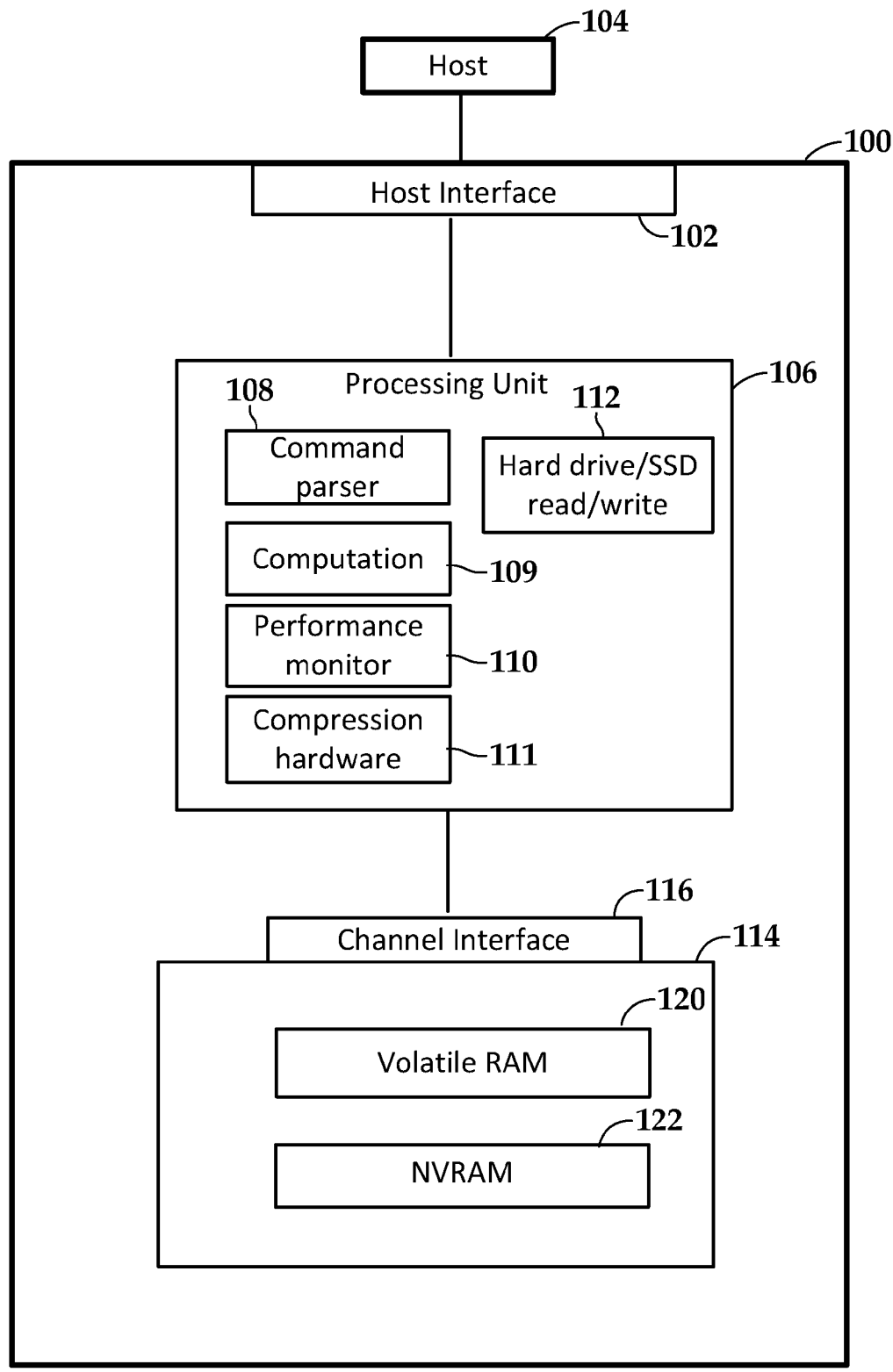
FIG. 1 is a block diagram of a storage compute device according to an example embodiment.

Some computational tasks are suited for massively distributed computing solutions. For example, data centers that provide web services, email, data storage, Internet search, etc., often distribute tasks among hundreds or thousands of computing nodes. The nodes are interchangeable and tasks may be performed in parallel by multiple computing nodes. This parallelism increases processing and communication speed, as well as increasing reliability through redundancy. Generally, the nodes may include rack mounted computers that are designed to be compact and power efficient, but otherwise operate similarly to desktop computer or server.

For certain types of tasks, it may be desirable to rearrange how data is processed within the individual nodes. For example, applications such as neuromorphic computing, scientific simulations, etc., may utilize large matrices that are processed in parallel by multiple computing nodes. In a traditional computing setup, matrix data may be stored in random access memory and/or non-volatile memory, where it is retrieved, operated on by relatively fast central processor unit (CPU) cores, and the results sent back to volatile and/or non-volatile memory. It has been shown that the bus lines and I/O protocols between the CPU cores and the memory can be a bottleneck for some types of computation.

This disclosure generally relates to use of a data storage device that performs internal computations on data on behalf of a host, and is referred to herein as a storage compute device. While a data storage device, such as a hard drive, solid-state drive (SSD), hybrid drive, etc., generally includes data processing capabilities, such processing is mostly related to the storage and retrieval of user data. So while the data storage device may perform some computations on the data, such as compression, error correction, etc., these computations are invisible to the host. Similarly, other computations, such as logical-to-physical address mapping, involve tracking host requests, but are intended to hide these tracking operations from the host. In contrast, a storage compute device makes computations based on express or implied computation instructions from the host, with the intention that some form of a result of the computation will be returned to the host and/or be retrievable by the host.

While a storage compute device as described herein may be able to perform as a conventional storage device, e.g., handling host data storage and retrieval requests, such storage compute devices may include additional computational capability that can be used for certain applications. For example, scientific and engineering simulations may involve solving equations on very large matrices. Even though the matrices may be sparse, and therefore amenable to a more concise/compressed format for storage, the matrices may still be cumbersome to move in and out of storage for performing operations. For example, if available volatile, random access memory (RAM) is significantly smaller than the objects being operated on, then there may be a significant amount of swapping data between RAM and persistent storage.

While a conventional storage device can be used to store objects such as matrices, such device may not be given information that allows it to identify the objects. For example, host interfaces may only describe data operations as acting on logical block addresses (or sectors), to which the storage device translates to a physical address. In contrast, a storage compute device will obtain additional data that allows the storage device to manage the objects internally. This management may include, but is not limited to, selection of storage location, managing of object identifiers and other metadata (e.g., data type, extents, access attributes, security attributes), compression, and performance of single or multiple object computations and transformations.

In embodiments described below, a storage compute device includes two or more compute sections that perform computations on computation objects. For purposes of this discussion, computation objects may at least include objects that facilitate performing computations on data objects. Computation objects may include stored instructions, routines, formulas, definitions, etc., that facilitate performing repeatable operations. A computation object may include data objects, such as scalars/constants that are utilized in all of the relevant computations and accessible by the compute section (e.g., using local or shared volatile memory). Other data objects are used and inputs and outputs of the computations, and may also include temporary objects used as part of the computations, e.g., intermediate computation objects.

In storage compute devices described below, a controller monitors resource collisions affecting a plurality of compute sections. The collisions may involve contention for computation and/or storage resources. For example, if an object is being read by two or more processes, there may be contention associated with storage channels used to read the object from a particular part of memory. In response to at least one of the resource collisions, the controller may create a copy of at least one of the computation objects. For example, the object may be copied to a portion of memory (e.g., a memory block) that is accessed in parallel with the original object at a second of the compute sections in response to the resource collisions. In other cases, the data object may be stored externally to the storage compute device, e.g., via a host interface. In such a case, the computation object may also be sent to the external storage compute device, and the computation proceeds in parallel on the external device.

In FIG. 1, a block diagram shows a storage compute device 100 according to an example embodiment. The storage compute device 100 may provide capabilities usually associated with data storage devices, e.g., storing and retrieving blocks of data, and may include additional computation abilities as noted above. Generally, the storage compute device 100 includes a host interface 102 configured to communicate with a host 104. The host interface 102 may use electrical specifications and protocols associated with existing hard drive host interfaces, such as SATA, SaS, SCSI, PCI, Fibre Channel, etc., and/or network interfaces such as Ethernet.

The storage compute device 100 includes a processing unit 106. The processing unit 106 includes hardware such as general-purpose and/or special-purpose logic circuitry configured to perform functions of the storage compute device 100, including functions indicated in functional blocks 108-112. Functional block 112 provides legacy storage functionality, such as read, write, and verify operations on data that is stored on media. Blocks 108-111 represent specialized functionalities that allow the storage compute device 100 to provide internal computations on behalf of the host 104.

Block 108 represents a command parser that manages object-specific and computation-specific communications between the host 104 and storage compute device 100. For example, the block 108 may process commands that define objects (matrices, vectors, scalars, sparse distributed representations) and operations (e.g., scalar/matrix mathematical and logical operations) to be performed on the objects. A computation section 109 performs the operations on the objects, and may be specially configured for a particular class of operation. For example, if the storage compute device 100 is configured to perform a set of matrix operations, then the computation section 109 may be optimized for that set of operations. The optimization may include knowledge of how best to store and retrieve objects for the particular storage architecture used by the storage compute device 100, and how to combine and compare data objects.

A performance monitor 110 analyzes the operations performed by the computation section 109 and determines resource collisions affecting the operations. A parallelization module 111 performs actions in response to the resource collisions. For example, the parallelization module 111 may create copies of objects for which resource collisions have been detected. In response, the parallelization module 111 may identify alternate resources that may be used in parallel with those resources currently under contention. In response the parallelization module 111 can create copies of data or computation objects, activate additional processes/threads for handling the parallel computations, and cause hardware modules to process the computations in parallel. The parallelization module 111 may also provide synchronization between the parallel operations, e.g., detecting a request to change a copied object, deny the request, cause the split operations to be rejoined before any modification is allowed, and/or synchronize the changes across the parallel operations. These synchronizations may occur within the storage compute device 100 and between multiple storage compute devices.

As noted above, the functional blocks 108-112 at some point will access persistent storage, and this can be done by way of a channel interface 116 that provides access to the storage unit 114. There may be a multiple channels, and there may be a dedicated channel interface 116 and computation section 109 for each channel. The storage unit 114 may include both volatile memory 120 (e.g., DRAM and SRAM) and non-volatile memory 122 (e.g., flash memory, magnetic media). The volatile memory 120 may be used as a cache for read/write operations performed by read/write block 112, such that a caching algorithm ensures data temporarily stored in volatile memory 120 eventually gets stored in the non-volatile memory 122. The computation blocks 108, 109 may also have the ability to allocate and use volatile memory 120 for calculations. Intermediate results of calculations may remain in volatile memory 120 until complete and/or be stored in non-volatile memory 122.

As noted above, it is expected that data objects may be too large in some instances to be stored in volatile memory 120, and so may be accessed directly from non-volatile memory 122 while the calculation is ongoing. While non-volatile memory 122 may have slower access times than volatile memory 120, it still may be more efficient to work directly with non-volatile memory 122 rather than, e.g., breaking the problem into smaller portions and swapping in and out of volatile memory 120.

Figure 2:
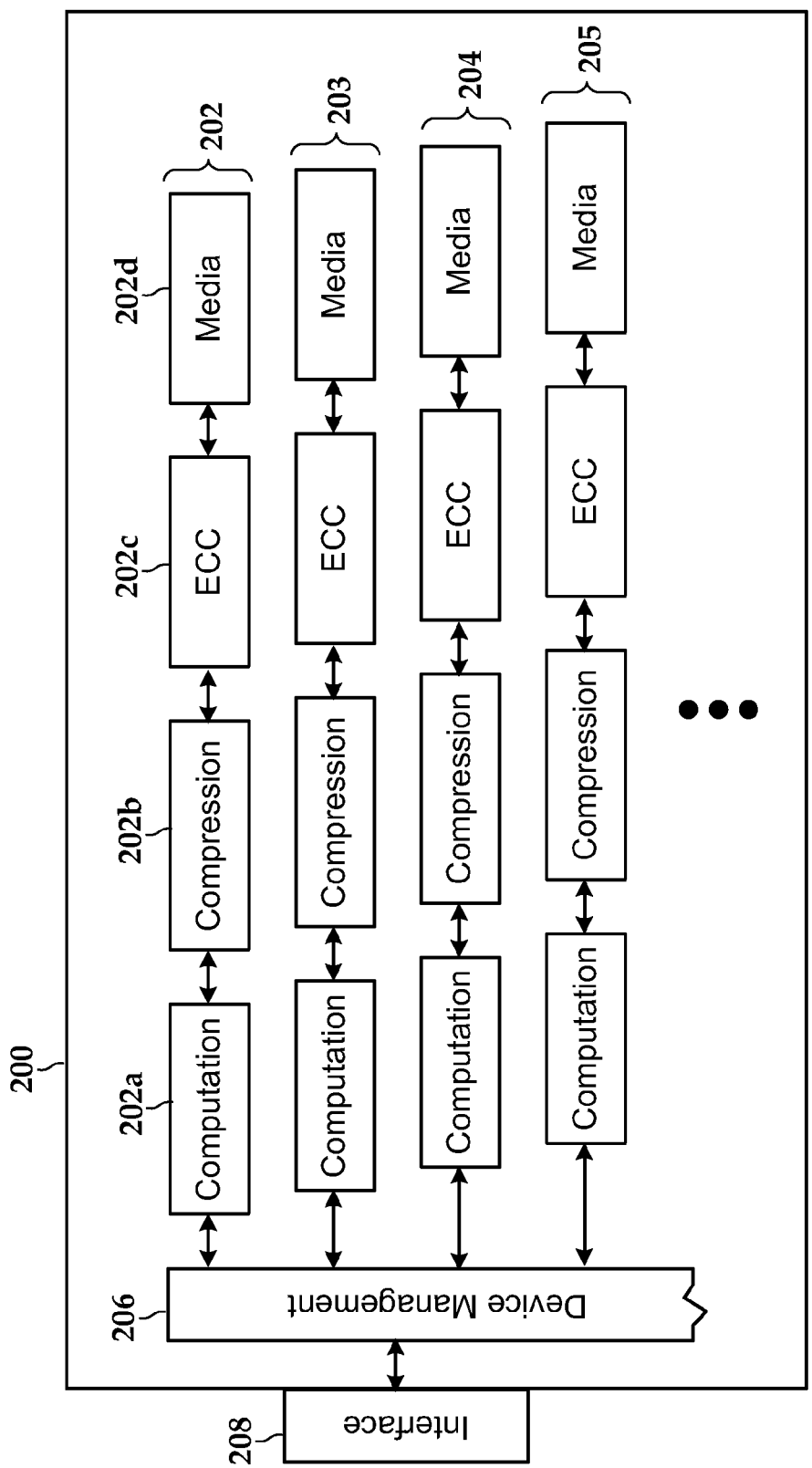
FIG. 2 is a block diagram showing multiple computation channels of a storage compute device according to an example embodiment.

As noted above, the channel interface 116 may already be configured for parallel operations for conventional data storage. This parallelism may be extended for internal computation operations as well, as shown FIG. 2, which is a block diagram of storage compute device according to an example embodiment. The example storage compute device 200 includes multiple computation channels 202-205 that are coordinated by a device management component 206. There may be more or fewer computation channels than shown. The device management component 206 may include a general-purpose central processing unit and/or a custom logic circuit (e.g., field programmable gate array) that performs particular functions such as storage operations and computations. The device management component 206 may operate via an interface 208, e.g., a host interface or internal interface.

The device management component 206 analyzes computations and determines how to allocate tasks between the channels 202-205. Using channel 202 as an example, it may include a computation section 202a, compression hardware 202b, error correction hardware 202c, and storage media 202d. The error correction hardware 202c and storage media 202d may be similar to those used in conventional storage devices, e.g., SSDs. Generally, the error correction hardware 202c adds error correction codes (ECC) to data encoded in the media 202d. The ECC is used to correct for channel and media errors when decoding data stored on the media 202d.

The computation section 202a is configured to perform part of a computation in parallel with computation engines of the other channels 203-205. The device management component 206 may decide on the division of work, divide the work accordingly (including any needed copying and synchronization), and dispatch the work to the channels 202-205. The device management component 206 may be able to extend this management so that some work occurs on external storage devices, e.g., coupled together via host interfaces or the like. In such a case, another layer of management, e.g., peer-to-peer or host-to-host management may be used to deal with the particulars of this type of parallelism.

Figure 3:
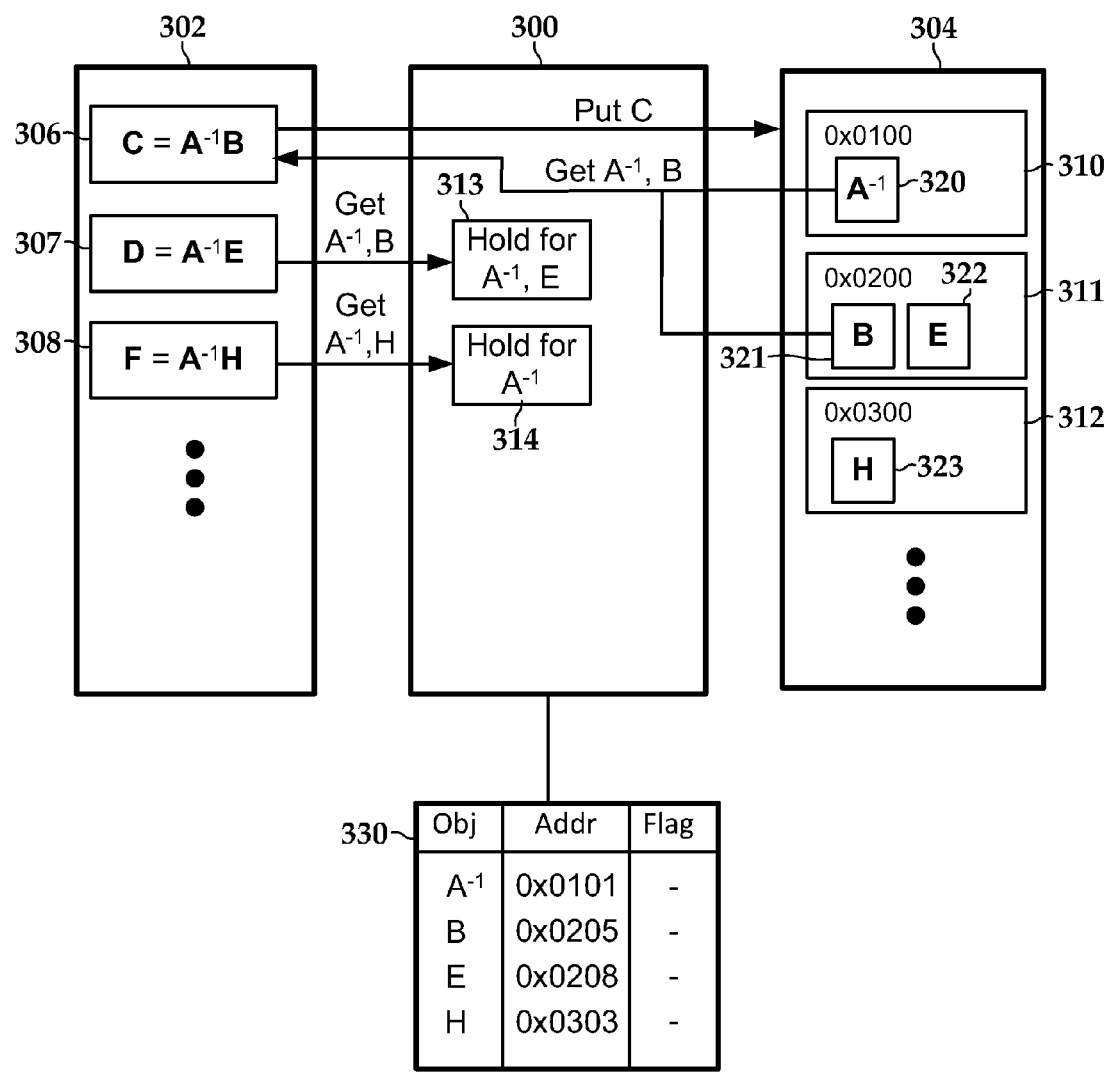
FIGS. 3-6 are block diagrams illustrating detection and management of resource collisions according to example embodiments.

In reference now to FIG. 3, a block diagram illustrates an example of parallel operations according to example embodiments. A controller 300 monitors computations being performed via a computation unit 302. The computation unit 302 includes computation objects 306-308 that, in this example, are matrix multiplications. Each of the computation objects 306-308 may be associated with a dedicated computation module, e.g., matrix multiplication hardware units that are capable of operating in parallel.

The computations operate on data objects 320-323 that are stored in memory blocks 310-312 of storage unit 304. It will be understood that while the storage unit 304 may be integral to the storage compute device, it may also be spread across devices, e.g., contained on and accessible by multiple storage compute devices via a host interface. In this example, the data objects 320-323 may be retrieved directly from the storage unit 304 to the computation units due to the size of the data objects 320-323, e.g., minimizing or eliminating the use of RAM buffers. Retrieval of a stored data object from a memory block 310-312 may result in the data object being locked down, thus preventing access to the same object by other computation modules.

In the diagram, computation object 306 has executed first, and is accessing data objects 320 and 321. These objects are located in memory blocks 310, 311 that may be accessed in parallel, and so the computation unit 302 may retrieve any portion of objects 320, 321 as needed. The result of the computation may be stored in yet another parallel accessible memory block (not shown) via the "Put" command. Computation object 307 is next to execute, but execution is blocked due to resource collision 313 being detected by controller 300. The resource collision 313 is due to data object 320 being in use by computation object 306. Data object 322 is also needed by computation object 307. While data object 322 is not currently in use, data object 322 is stored in the same memory block 311 as data object 321, which is being used by computation object 306. This may slow down or block access to object 322, and as such is indicated as part of resource collision 313. Similarly, computation object 308 is blocked from accessing data object 320, as indicated by resource collision 314.

The controller 300 may perform mitigation operations (described below in reference to FIGS. 4-6) based on the resource collisions 313, 314. If the collisions are repeated (e.g., regularly polling to determine if the blocking condition is cleared), a count of the collisions may be maintained for each computation object 307, 308, and action taken when an individual count exceeds a threshold. In other arrangements, a total count of collisions for all computation objects may be maintained, and all objects (or a portion thereof) may be subject to mitigation actions as described below if the total count exceeds a threshold. Other counts may be used to make determination, e.g., number of blocked objects, which is two for collision 313, and one for collision 314.

Also shown in FIG. 3 is a lookup table 330 that is accessed and maintained by the controller 300 to locate objects within the storage unit 304. Other structures may be used instead of or in addition to a table, e.g., list, hash set, map, binary tree, etc. In this example, the table 330 includes a starting address (second column) mapped to an identifier (first column) for each data object. The addresses also indicate the memory block 310-312 in which the objects 320-323 are stored. For example the starting address for memory block 310 is 0x0100, and the object 320 is located at address 0x0101 as indicated in the table 330. In such a case, the identity of the memory block 310 for address of data object 320 can be determined using a bitwise AND of the address (0x0101) and 0x1100. The rightmost column in the table 330 includes flags that indicate, for example, access limitations or other conditions of use. In FIG. 3, the flags in table 330 indicate no limitations or conditions of use for any objects 320-323.

Figure 4:
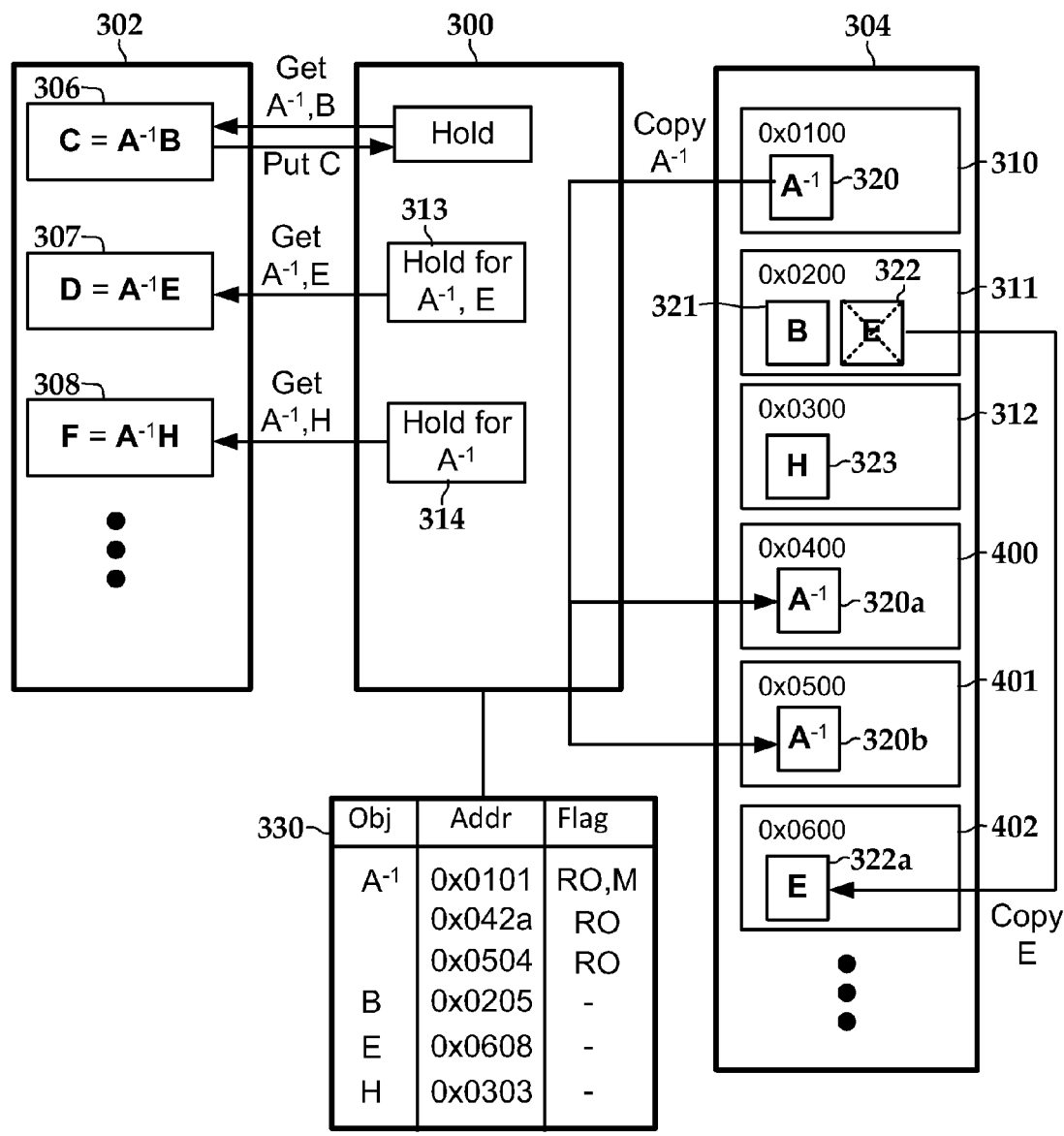

The controller 300 at least detects the resource collisions 313, 314, and may also manage them, e.g., putting holds/locks on processes, threads, hardware modules, etc., that are involved in computations 307, 308. In FIG. 4, a block diagram illustrates how the controller 300 may mitigate effects of the resource collisions according to an example embodiment. The previously executing computation object 306 may be paused as shown in order to carry out the mitigation. Alternatively, the computation object 306 may be allowed to continue executing if the actions described below can be performed in parallel with the computation 306, e.g., internally within channels of the storage unit 304.

Because computation objects 307, 308 are waiting on at least one of memory blocks 310 and 311, data objects 320, 322 are copied to different memory blocks 400-402, which may be accessed in parallel with each other and with memory blocks 310-312. The object 320 is needed by three different computation objects 306-308, and so two more copies 320a-b are made of object 320, the copies 320a-b placed into memory blocks 400, 401. A copy 322a of object 322 is placed in block 402. Because object 322 is only needed by computation object 308, the original data object 322 may be deleted (or marked as deletable). In such a case, this is equivalent to moving object 322 to new location in block 402, where it is now referred to as object 322a.

The copying and/or moving of the objects 320, 322 are recorded in the updated table 330 shown in FIG. 4. Because there are three copies of original data object 320, the flags are set to read-only (RO). Further, data object 320 at address 0x0101 is flagged as the master object (M), e.g., the first copy of the object that was the subject of a resource collision. This flag may be used where changes are later requested to an object that has been duplicated. For example, if there is a dependency between computation objects, it may be necessary to pause or cancel at least some computations involving a data object that is subject to change by another computation object. The master object in such a case may be the one that continues to be used for computation, whether or not it is the object that is subject to change. If the computation objects are independent, it may be possible to change the one copy of a data object if this does not change the results of parallel computations that are still proceeding using copies of that object.

Figure 5:
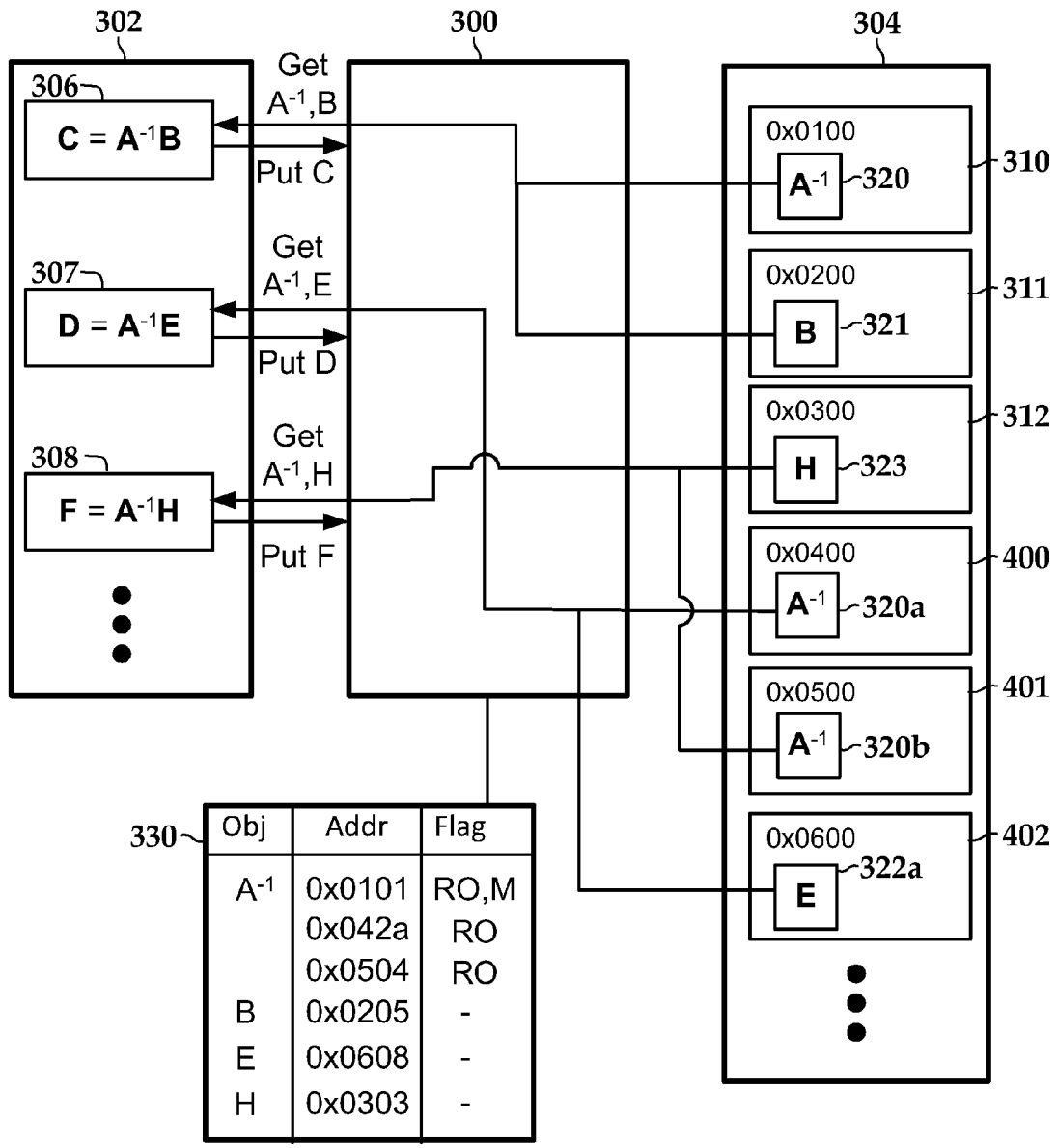
Figure 6:
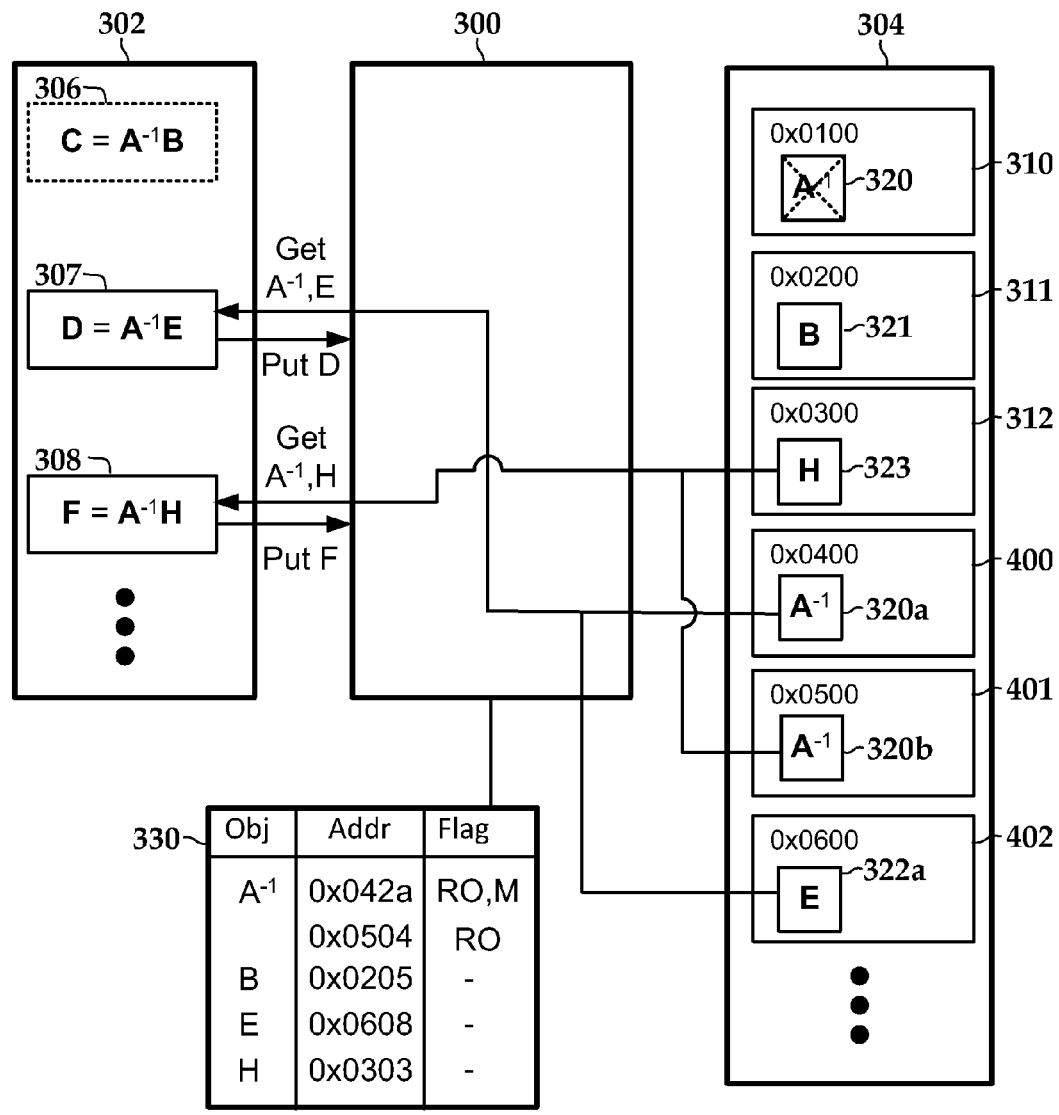

After copying the data objects, the computations can proceed in parallel as shown in FIG. 5. Each computation object 306-308 is using either the original data object 320 or a copy 320a-b. Computation object 307 is using copied/moved object 322a. As the computations objects 306-308 complete their tasks, any duplicate objects can be removed. This is shown in FIG. 6, where computation object 306 has completed as indicated by the dashed line. As copied object 320 is no longer used, it can be deleted (or marked as deletable) and the table 330 updated. In this case, the next copy of data object 320 is data object 320a, and so object 320a is marked as the master object in the table 330. Both objects 320a-b are copies, and so the RO flag is maintained for these objects in the table 330. If one of the objects 320a-b is done being used by a computation object, the RO and M flags can then be removed.

It should be noted that in cases where there is sufficient available storage, copies of data objects marked for deletion need not be deleted. A record of copied data objects that are no longer in use can still be maintained, and such data objects can be reused without having to make an additional copy. The record would be linked with records that track the original objects, e.g. via table 330. Assuming the original object is not changed, the data object can be marked as deletable but reusable. If the original data object is changed, then the data object is marked as deletable and not reusable, and any references to the duplicate data object may be deleted as well.

Figure 7:
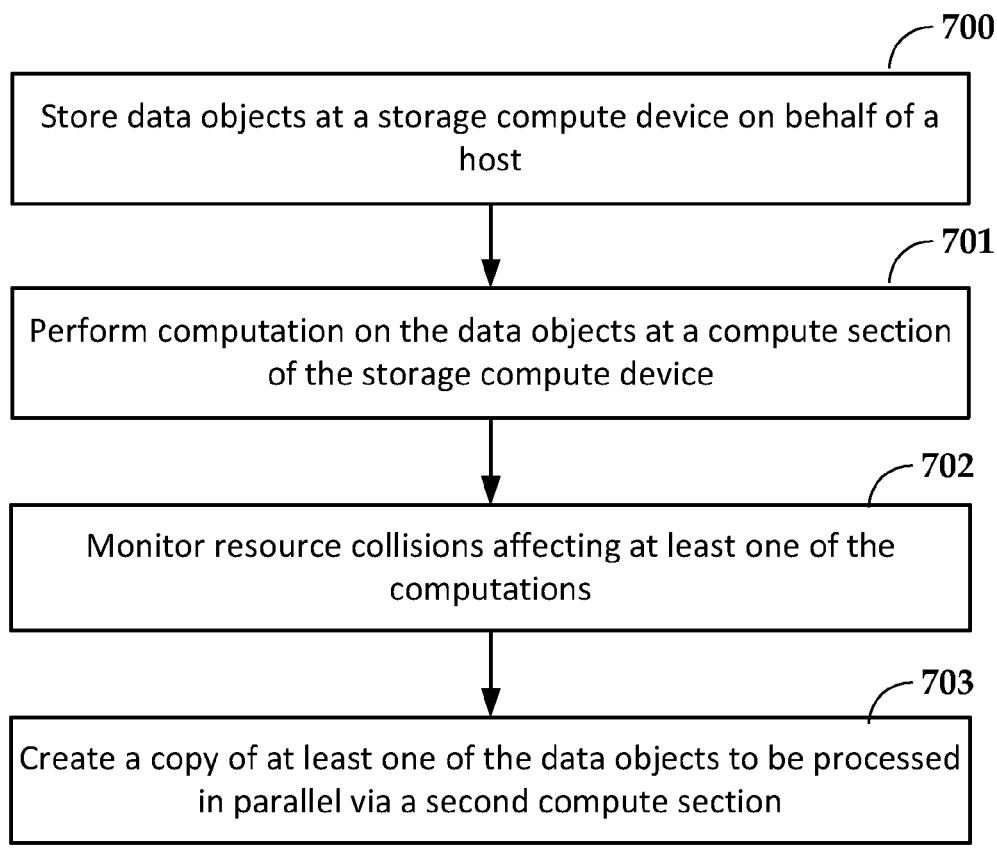
FIG. 7 is a flowchart illustrating a method according to an example embodiment.

In reference now to FIG. 7, a flowchart shows a method of dealing with resource contention in a storage compute device according to an example embodiment. The method involves persistently storing 700 data objects at a storage compute device on behalf of a host. The data objects are internally managed by the storage compute device. Computations are performed 701 on the data objects at a compute section of the storage compute device. Resource collisions affecting at least one of the computations are monitored 702. In response to the resource collisions a copy of at least one of the data objects is created 703 to be processed in parallel via a second compute section. The second compute section may be on the storage compute device or external to the storage compute device.

Figure 8:
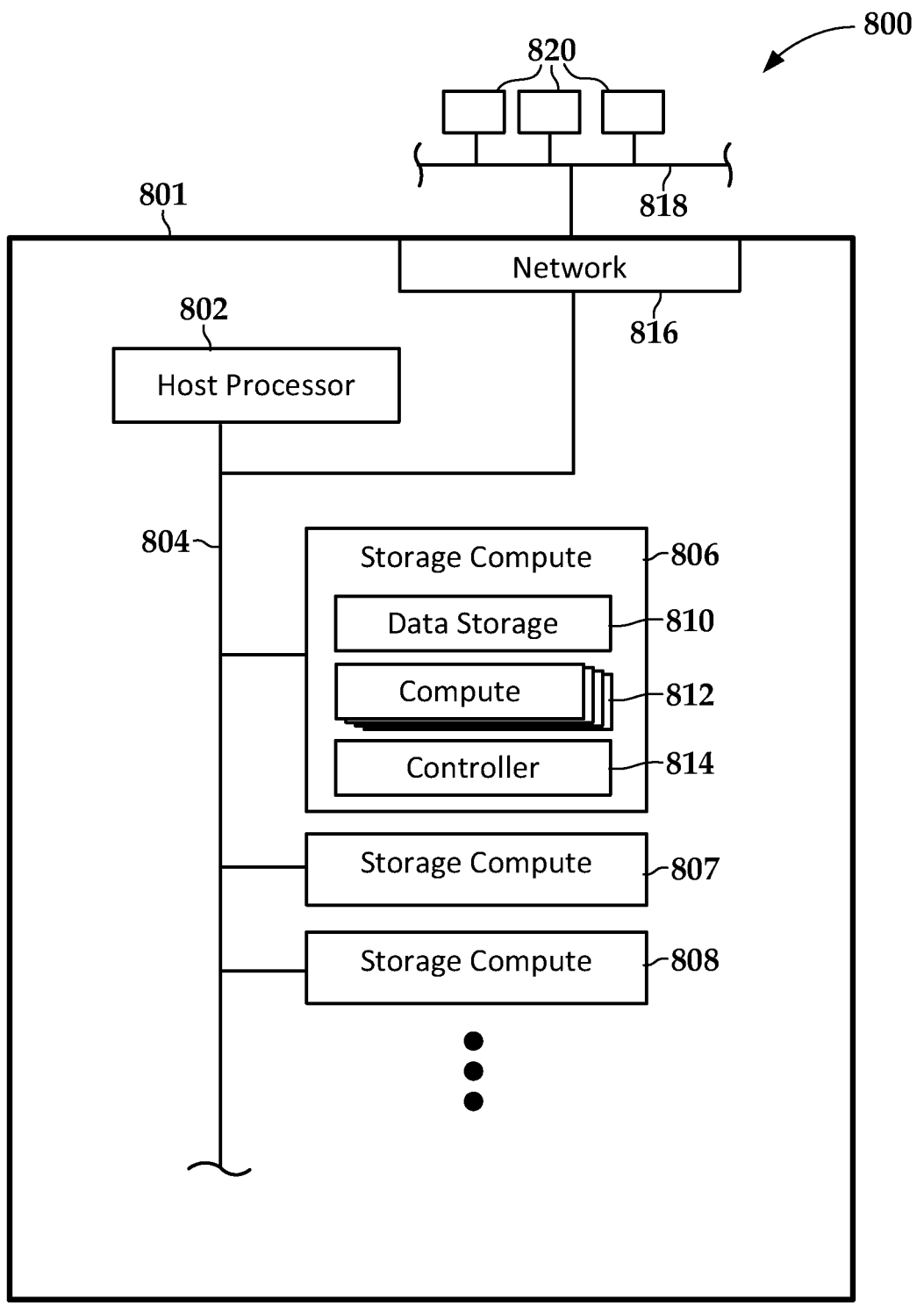
FIG. 8 is a block diagram illustrating a system according to an example embodiment.

In reference now to FIG. 8, a block diagram illustrates a system 800 according to an example embodiment. The system includes a host device 801 with a host processor 802 that is coupled to a data bus 804. The data bus 804 may include any combination of input/output transmission channels, such as southbridge, PCI, USB, SATA, SaS, etc. On or more storage compute devices 806-808 are coupled to the data bus 804. As shown for storage compute device 806, each of the devices 806-808 includes a data storage section 810 that facilitates persistently storing data objects on behalf of the host processor. The data objects being internally managed by the storage compute device 806. The storage compute devices 806-808 include two or more compute sections 812 that perform computations on the data objects, and a controller 814.

The controller 814 monitors resource collisions affecting a first of the compute sections 812. In response to the resource collisions, the controller 814 creates a copy of at least one of the data objects to be processed in parallel at a second of the compute sections. The second of the compute sections may be on the storage compute device on which the collision occurred, or on another device coupled to the local bus 804. In other embodiments, the host device 801 may coupled to a network 818 via a network interface 816. Other similarly configured host devices 820 of the network 818 may also be able to process tasks in parallel with those of the host device 801.

The storage compute devices 806-808 may be able to coordinate copying of objects and distribution of parallel tasks on a peer-to-peer basis, e.g., without coordination of the host processor 802. In other arrangements, the host processor 802 may provide some or all direction in dividing inter-host distribution of tasks in response to resource collisions. If the distribution of tasks extends to the network 818, then the host processor 802 may generally be involved, at least in providing underlying network services, e.g., managing access to the network interface, processing of network protocols, service discovery, etc.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A storage compute device comprising:
   a host interface capable of communicating with a host computer, the storage compute device being coupled to the host computer via a data bus, the host interface providing legacy storage functionality that includes storing data on and retrieving data from the storage compute device using an existing storage drive protocol, the host interface further configured to receive a computation instruction from the host computer that allows the storage compute device to provide an internal computation on behalf of the host computer;
   a command parser that receives and processes the computation instruction from the host interface;
   a data storage section that facilitates persistently storing host data as data objects in response to the computation instruction, the storage compute device further obtaining additional data that allows the storage compute device to manage the data objects internally;
   two or more compute sections that perform computations on the data objects in response to the computation instruction; and
   logic circuitry comprising a controller that monitors computation or storage resource collisions affecting a first of the compute sections as a result of the computations performed on at least one of the data objects by the first compute section, the controller creating a copy of the at least one data object to be processed in parallel at a second of the compute sections in response to the resource collisions.

2. The storage compute device of claim 1, wherein creating the copy of the at least one data object comprises storing the copy in a first memory block that can be accessed in parallel with a second memory block that stores the at least one data object.

3. The storage compute device of claim 1, wherein creating the copy of the at least one data object comprises storing the copy in a second storage compute device via a host interface.

4. The storage compute device of claim 1, wherein monitoring the resource collisions comprises counting the resource collisions for each of the data objects, and copying the data objects for which a count of the resource collisions exceeds a threshold.

5. The storage compute device of claim 1, wherein the controller causes the at least one data object and the copy to be marked as read-only after creating the copy.

6. The storage compute device of claim 5, wherein the controller further marks a selected one of the copy and the at least one data object for deletion after an operation affecting the selected data object completes.

7. The storage compute device of claim 6, wherein the controller further performs:
marking the selected data object as reusable; and
reusing the selected data object in response to another resource collision affecting another of the copy and the at least one data object.

8. The storage compute device of claim 6, wherein the controller further performs:
marking the selected data object as reusable;
detecting a modification of another of the copy and the at least one data object; and
marking the selected data object as not reusable.

9. The storage compute device of claim 1, wherein the storage compute device is located within the host computer and coupled via a local data bus.

10. The storage compute device of claim 1, wherein the existing storage drive protocol comprises one of SATA, SaS, SCSI, and PCI.

11. A method comprising:
receiving a computation instruction from the host computer via a host interface that allows the storage compute device to provide an internal computation on behalf of the host computer, the storage compute device coupled to the host computer via a data bus, the host interface capable of providing legacy storage functionality that includes storing data on and retrieving data from the storage compute device on behalf of the host computer using an existing storage drive protocol;
receiving and processing the computation instruction from the host interface via a command parser;
persistently storing data objects at a storage compute device in response to the computation instruction;
obtaining additional data that allows managing the data objects internally by the storage compute device;
performing computations on the data objects at a compute section of the storage compute device, in response to the computation instruction;
monitoring computation or storage resource collisions affecting the computations performed on at least one of the data objects; and
creating a copy of the at least one data object to be processed in parallel via a second compute section in response to the resource collisions.

12. The method of claim 11, wherein creating the copy of the at least one data object comprises storing the copy in a first memory block that can be accessed in parallel with a second memory block that stores the at least one data object.

13. The method of claim 11, wherein creating the copy of the at least one data object comprises storing the copy in a second storage compute device via a host interface.

14. The method of claim 11, wherein monitoring the resource collisions comprises counting the resource collisions for each of the data objects, and copying the data objects for which a count of the resource collisions exceeds a threshold.

15. The method of claim 11, further comprising marking the at least one data object and the copy as read-only after creating the copy.

16. The method of claim 15, further comprising marking a selected one of the copy and the at least one data object for deletion after an operation affecting the selected data object completes.

17. The method of claim 16, further comprising:
marking the selected data object as reusable; and
reusing the selected data object in response to another resource collision affecting another of the copy and the at least one data object.

18. The method of claim 16, further comprising:
marking the selected data object as reusable;
detecting a modification of another of the copy and the at least one data object; and
marking the selected data object as not reusable.

19. A host computer comprising:
a host processor;
a data bus coupled to the host processor; and
a storage compute device located within the host computer and locally coupled to the data bus and comprising:
a host interface capable of communicating via the data bus, the host interface providing legacy storage functionality that includes storing data on and retrieving data from the storage compute device using an existing storage drive protocol, the host interface further configured to receive a computation instruction from the host computer that allows the storage compute device to provide an internal computation on behalf of the host computer;
a command parser that receives and processes the computation instruction from the host interface;
a data storage section that facilitates persistently storing data objects in response to the computation instruction, the storage compute device obtaining additional data that allows managing the data objects internally by the storage compute device;
two or more compute sections that perform computations on the data objects in response to the computation instruction; and
a controller that monitors computation or storage resource collisions affecting a first of the compute sections as a result of the computations performed on at least one of the data objects by the first compute section, the controller creating a copy of the at least one data object to be processed in parallel at a second of the compute sections in response to the resource collisions.

20. The host computer of claim 19, wherein creating the copy of the at least one data object comprises storing the copy in a first memory block that can be accessed in parallel with a second memory block that stores the at least one data object.

21. The host computer of claim 19, further comprising a second storage compute device locally coupled to the data bus, and wherein creating the copy of the at least one data object comprises storing the copy in the second storage compute device via the data bus.

* * * * *